(12) United States Patent
Ohligs

(10) Patent No.: US 12,432,315 B2
(45) Date of Patent: Sep. 30, 2025

(54) DEVICE FOR DISPLAYING IMAGES, AND USE OF A DEVICE OF THIS TYPE

(71) Applicant: Jochen Ohligs, Korschenbroich (DE)

(72) Inventor: Jochen Ohligs, Korschenbroich (DE)

( * ) Notice: Subject to any disclaimer, the term of this patent is extended or adjusted under 35 U.S.C. 154(b) by 254 days.

(21) Appl. No.: 18/009,640

(22) PCT Filed: May 28, 2021

(86) PCT No.: PCT/DE2021/000101
§ 371 (c)(1),
(2) Date: Dec. 9, 2022

(87) PCT Pub. No.: WO2021/249586
PCT Pub. Date: Dec. 16, 2021

(65) Prior Publication Data
US 2023/0231970 A1 Jul. 20, 2023

(30) Foreign Application Priority Data
Jun. 12, 2020 (DE) .......................... 102020003522.1

(51) Int. Cl.
*H04N 7/14* (2006.01)
*H04N 5/262* (2006.01)
(Continued)

(52) U.S. Cl.
CPC ........... *H04N 7/144* (2013.01); *H04N 5/2624* (2013.01); *H04N 7/15* (2013.01); *H04N 23/90* (2023.01); *H04R 1/028* (2013.01)

(58) Field of Classification Search
CPC ........ H04N 7/144; H04N 5/2624; H04N 7/15; H04N 23/90; H04N 7/14; H04N 5/262; H04R 1/028; H04R 1/02
See application file for complete search history.

(56) References Cited

U.S. PATENT DOCUMENTS 6,717,607 B1 4/2004 Lauper et al.
7,535,468 B2 5/2009 Uy
(Continued)

FOREIGN PATENT DOCUMENTS

JP 2000270306 9/2000
KR 1020150087017 7/2015
(Continued)

OTHER PUBLICATIONS

PCT/DE2021/000101 International Preliminary Examination Report dated Aug. 24, 2022.

*Primary Examiner* — Yosef K Laekemariam
(74) *Attorney, Agent, or Firm* — Ralph E. Jocke; WALKER & JOCKE

(57) ABSTRACT

Exemplary arrangements relate to a user communication device (1) for displaying images, which has an image display surface (12), speakers (19), and a microphone (11). At least one camera (10, 10a, 10b) is disposed in at least one region of the image display surface. When the device is used, the image display surface of a first device is positioned relative to a first user (14) such that the eyes (16) of the user are directed toward the at least one camera. Subsequently, additional users (20, 21) are positioned in front of additional devices in remote locations. The images of the additional users are displayed in certain regions (4 to 9) of the image display surface of the device of the first user, such that the users all appear to be positioned around a virtual table and able to look directly at one another.

26 Claims, 2 Drawing Sheets

(51) Int. Cl.
*H04N 7/15* (2006.01)
*H04N 23/90* (2023.01)
*H04R 1/02* (2006.01)

(56) References Cited

U.S. PATENT DOCUMENTS

| | | |
|---|---|---|
| 9,681,096 B1 | 6/2017 | Motta et al. |
| 9,759,420 B1 | 9/2017 | Baloga |
| 10,182,210 B1 | 1/2019 | Goetzinger, Jr. |
| 10,452,195 B2 * | 10/2019 | Wang .................... G06F 3/0418 |
| 2010/0066800 A1 | 3/2010 | Ryf et al. |
| 2010/0154076 A1 | 6/2010 | Bruce et al. |
| 2010/0208029 A1 * | 8/2010 | Marti .................... G06F 1/1601 |
| | | 348/14.02 |
| 2014/0098179 A1 | 4/2014 | Moore |
| 2015/0334505 A1 * | 11/2015 | Crutchfield ............. G06F 3/165 |
| | | 381/17 |
| 2019/0306456 A1 | 10/2019 | Liu |
| 2019/0306459 A1 | 10/2019 | Liu |

FOREIGN PATENT DOCUMENTS

| WO | WO 2014/055058 | * | 4/2014 |
|---|---|---|---|
| WO | WP2014055058 | | 4/2014 |

\* cited by examiner

DEVICE FOR DISPLAYING IMAGES, AND USE OF A DEVICE OF THIS TYPE

TECHNICAL FIELD

Exemplary arrangements relate to a user communication device for displaying images, with a surface which forms an image display surface, a speaker and a microphone, and the use of similar apparatus.

BACKGROUND

In particular for video conferences, devices are known which display images on an image display surface, wherein the image of a conference partner is usually displayed on the image display surface and a microphone is arranged in the vicinity of the image display surface to record the speech of the video conference participant.

The display of images, as used herein includes the display of stationary images, moving images or videos. In particular, in the case of video conferences, the conference participants should be able to follow the speech and image of each conference participant. Various video communication systems are known for this purpose which, however, have various deficiencies.

With some existing systems each user must decide during the video conference whether he looks into the camera or onto the pictorial representation of the discussion partner on the screen or display. Each video conference participant certainly sees the conference partners but there is no perception of real eye contact.

In most cases, the recording and viewing angle is so restricted that gestures of the discussion participant are only identified unsatisfactorily.

Since each discussion partner is responsible for his own display using his camera, the discussion participants are usually recorded and displayed in various manners using different image sections.

This has the result that the conversation technique is not dynamic and intuitive as in a real conversation but is determined by the technology and the operation of the technology.

As a result existing user communication devices and systems may benefit from improvements.

SUMMARY

Exemplary arrangements provide a user communication device for displaying images, with a surface which forms an image display surface and a microphone, that is configured so that perceived eye contact is made in a simple manner.

In exemplary arrangements enhanced usability is achieved by arranging at least one camera in the region of the image display surface of a user communication device.

In contrast to the prior art in which the camera is arranged next to the image display surface, according to some exemplary arrangements the camera is arranged within the image display surface. The image display surface can have small holes for this purpose or the camera can be so small that it is barely or not at all visible within the image display surface. In addition, the camera can record images through the image display surface when the camera is for example integrated in the image display surface. However, in alternative arrangements the image display surface can be constructed of a plurality of partial surfaces in which case cameras are then positioned between the partial surfaces. The more partial surfaces that are formed, the more precisely the cameras can be positioned. Alternatively the images that one or more cameras arranged within the image display surface would produce can also be calculated by means of circuitry such as a computer operating appropriate software, from data corresponding to views of at least two cameras, which can be arranged at any position such as, for example, next to the periphery of an image display surface.

In some exemplary arrangements the surface forming the image display surface is curved or even spherically curved. In some arrangements, the surface can have a radius of more than 0.5 m and in some arrangements more than 0.8 m. In some arrangements the image display surface may have a radius of less than 2 m and in some arrangements less than 1.5 m.

The curved or even spherically curved display surface makes it possible to record the image data corresponding to the discussion participant with the camera as if he is looking onto the image display surface. For this purpose the image display surface can be positioned at the height of the eyes (eye level) of the discussion participant and in the case of a curved or even spherically curved surface, the head and in particular the eye of the user can lie at the center of the curvature. As a result, the immersive effect is improved and the eyes need not refocus on the image display surface when different areas of the image display surface are viewed.

In some arrangements the image display surface has a plurality of cameras. This enables a camera to be assigned to various persons of a video conference where images are displayed on the image display surface, which camera is arranged in the region in which the image of the video conference participant is displayed on the image display surface.

In some exemplary arrangements the cameras are arranged at eye level of the user observing the image display surface. Constructively this may be achieved by arranging the cameras on a line. This line can be a line of an arc and is usually straight. In the case of a spherically curved image display surface, the cameras may be arranged on the equator of the image display surface. In the case of camera images calculated by means of suitable circuitry and software, the cameras may be arranged next to the image display surface or next to the image display surfaces positioned at the periphery of the display surface above and below the virtual camera positions calculated in a line or line of arc at eye level.

Since images are displayed on the image display surface, in particular in image projections, a problem may arise that the light used for the display of the images radiates onto the camera and impairs the quality of the images captured by the camera. It is therefore useful in some arrangements that the camera have a hanging sunshade. An exemplary hanging sunshade may be of a type used with traffic lights that shields the camera from laterally incident light. Depending on the incidence of light, a hanging sunshade can therefore extend only around a part of the lens of a camera or around the entire camera lens. Alternatively or cumulatively, the laterally incident light can also be eliminated from the camera image using circuitry and software since it is known at all times which light is incident laterally of the camera on the image display surface or is produced thereby.

A first exemplary arrangement provides that the image display surface is a display such as in particular an LCD, an LED or an OLED screen. The image display screen therefore shows the image actively, preferably illuminated in different colors.

In some arrangements, the display or the surface can have image sensors as cameras. These image sensors can be visibly identifiable on the image display surface as cameras. However, in some exemplary arrangements cameras can also be integrated in the display surface so that they are not visible as far as possible. For example, in some arrangements the image sensors of cameras can be integrated in the layer structure of the display.

An alternative arrangement provides that the user communication device comprises a projector and the image display surface is a reflection surface. This may make it easier to integrate cameras or image sensors in the image display surface, which are as far as possible invisible and at least not disturbing.

Furthermore, it may be useful in some arrangements if the image display surface has a plurality of loudspeakers which are alternatively referred to herein as speakers. This makes it possible to assign respectively one loudspeaker to various positions of the image display surface so that sound can be perceived by the user and acoustically identified as originating from a region on the image display surface where an image is displayed of a remote conference participant from which the sound originates and comes from. This makes it easier to assign a sound or speech to a specific video conference participant imaged on the image display surface.

In some arrangements it is useful if the loudspeakers are arranged on one or a plurality of horizontal lines. As a result, various video conference participants can be displayed in adjacent regions of the display surface aligned along a horizontal line and the various loudspeakers are each assigned to a video conference participant whose image is displayed on the image display surface. However, the loudspeakers can alternatively be arranged in a manner that is distributed over the image display surface and then that speaker nearest to the displayed image of the person speaking is always activated. However, in other arrangements the reproduction of sound can also be integrated in partial surfaces of the image display surface since the image display surface is also used for sound production. This is achieved, for example, by bending wave sound conversion.

Useful results are also achieved by a method for using such user communication devices in which a first device is positioned relative to a first user so that the eyes of the user are aligned with the view of at least one camera, positioning further users in front of further such devices at remote locations, displaying the images corresponding to the recording of data of the view of the further users on specific regions of the image display surface of the device of the first user as arranged around a virtual table, for example, recording data corresponding to an image of the first user with the camera and determining onto which region of the image display surface the facing and viewing direction of the first user points.

In exemplary arrangements data corresponding to images of the first user is recorded by as many cameras as there are further users in a video conference. As a result, on the image display surface disposed images are displayed for all further users of the video conference and optionally also for the first user. Circuitry can operate responsive to image data to determine areas on the image display surface onto which the first user is facing or looking, for example, when the user addresses a displayed image of one of the further users. Thus, it is possible that the first user decides into which camera he is looking. The viewing direction of the user onto a displayed image of a further user is predefined by the position of the display of the image of the further user on the image display surface. In the case of data corresponding to camera images calculated by means of circuitry and software, the cameras of the other user may be arranged next to the periphery of the image display surface precisely above and precisely below the virtual camera positions calculated in a line or line of arc at eye level.

However, the viewing or facing direction of a user can also be determined, for example, using image processing circuitry. As a result the system knows the region of the image display surface onto which the first user is facing and/or looking. The camera arranged there can then be used to show precisely the data corresponding to the image of the camera view of the camera positioned there, to the other person participating in the conference whose image is displayed on this region of the image display surface.

In some arrangements it is useful if data corresponding to a plurality of images of the first user are captured and recorded using a plurality of cameras of the first device, and that camera is determined which is arranged closest to the region of the image display surface onto which the viewing or facing direction of the first user is currently pointed. Image processing circuitry therefore provides the region of the image display surface onto which the first user is facing and is looking. To this end, from the data corresponding to images of the respective views of a plurality of cameras, that camera which comes closest to direct eye contact is determined and selected. In the case of a plurality of video conference participants, a plurality of regions are required on the image display surface which are each assigned to a video conference participant and display an image of the respective video conference participant. This also makes it possible to record the data corresponding to images of the first user using a plurality of cameras of the first device, in order to use these images by means of a motion-capture method to detect and determine via the circuitry, the movements and gestures of the first user, and use them for device interactions. In particular it is thereby possible to control the functions of the first device and also further devices. The detection of the movement of the first user in some arrangements may also include circuit detection and determination of eye movements in order to use eye tracking for device control.

In exemplary arrangements the user whose displayed image corresponds to the region of the display surface onto which the viewing direction of the first user is directed, can be determined through operation of the circuitry, and on their device this user is displayed an image based on the image data corresponding to the view of that camera that is arranged closest to the image display surface onto which the viewing direction of the first user is pointed. It is therefore firstly determined by the circuitry, which region of the image display surface the first user is facing and therefore looking at. This is achieved by the circuitry using the data that corresponds to a view of a camera or a plurality of cameras in the region of the image display surface. Then precisely the data corresponding to the image view of that camera in the direction of which the first user is looking is processed by the circuitry so that only signals which correspond to data of the image view of that camera is transmitted as signals to that remote user device to whom the user image on the first user's image display surface corresponds.

In an exemplary arrangement the first user thus looks at (faces) a specific region of the image display surface and thus at a specific video conference participant whose image is displayed in the region, and the user device of this video conference participant receives signals which correspond to an image view of a camera which is aligned directly on the facing first user. Thus, simulated direct eye contact is obtained with the user at whom the first user is looking. In exemplary arrangements this function is aligned bilaterally so that users who are looking at a region of the image display surface with a video conference partner look directly into the camera assigned to this video conference partner so that they have simulated direct eye contact with one another as long as they look onto a specific region of the image display surface on which a specific video conference partner is imaged.

In the case of a number (n) of video conference participants, the exemplary circuitry operates to cause respectively one region of the image display area to be reserved for the display of images from one video conference participant, and this region is assigned respectively by the circuitry one camera from (n) cameras. These cameras can be arranged horizontally next to one another linearly along a horizontal line on the image display surface. However, in other arrangements the cameras can also be arranged on a circular arc as on a round table and assigned to regions of the image display surface arranged on this circular arc which are each assigned to present the images of a respective video conference participant.

In this way, the circuitry may be operative to simulate direct eye contact between video conference participants. Furthermore, however, in some exemplary arrangements the sound or the voice of a video conference participant can be caused to sound precisely so it is perceived by a user to come from the region of the image display surface which is assigned to display images to the respective video conference participant. For this purpose the exemplary circuitry operates to that the sound of the first user is recorded (captured) with a microphone, and in the case of further users, is caused to be delivered via a loudspeaker which is arranged closest to the region of the image display surface to which the viewing direction of the first user points when viewing the region in which the image of the respective further user is displayed.

When using such an exemplary user communication device, in particular with such a method, each user no longer needs to decide during use whether he is looking into a camera or the image display surface. When looking at an image of a discussion participant on the image display surface, the user automatically looks into the camera which is assigned to the discussion partner. The users can see each other as is usual in real conversation when both are physically at the same location. Even persons who are not actually speaking to each other can see each other and by using several cameras each participant knows who is looking at whom.

A large screen with several discussion partners and (n) individually selected sized regions of the image display surface, with each region assigned and caused by the circuitry to display images of a selected discussion participant, ensures that the recording and reproduction viewing angles are not unduly restricted. Gestures by a user are transmitted identifiably. In exemplary arrangements the discussion participants can be imaged by having data corresponding to views of the cameras on their communication device captured by the circuitry thereof in original size with their complete upper body together with arms and hands. In this case, the region of the image display surface at which the first user is looking can have images therein be displayed enlarged, or those regions which are assigned to the users who are currently speaking can be shown enlarged for example.

Alternatively data corresponding to camera views of all discussion partners can be recorded, transmitted as signals and reproduced as displayed images on other devices in the same manner so that all discussion participants participate equally in the discussion. This allows the discussion to be conducted dynamically and intuitively as in real discussion situations.

Exemplary arrangements of a user communication device apparatus and a method for use of such devices are further described hereinafter in the Detailed Description.

DETAILED DESCRIPTION

Figures 1, 2:
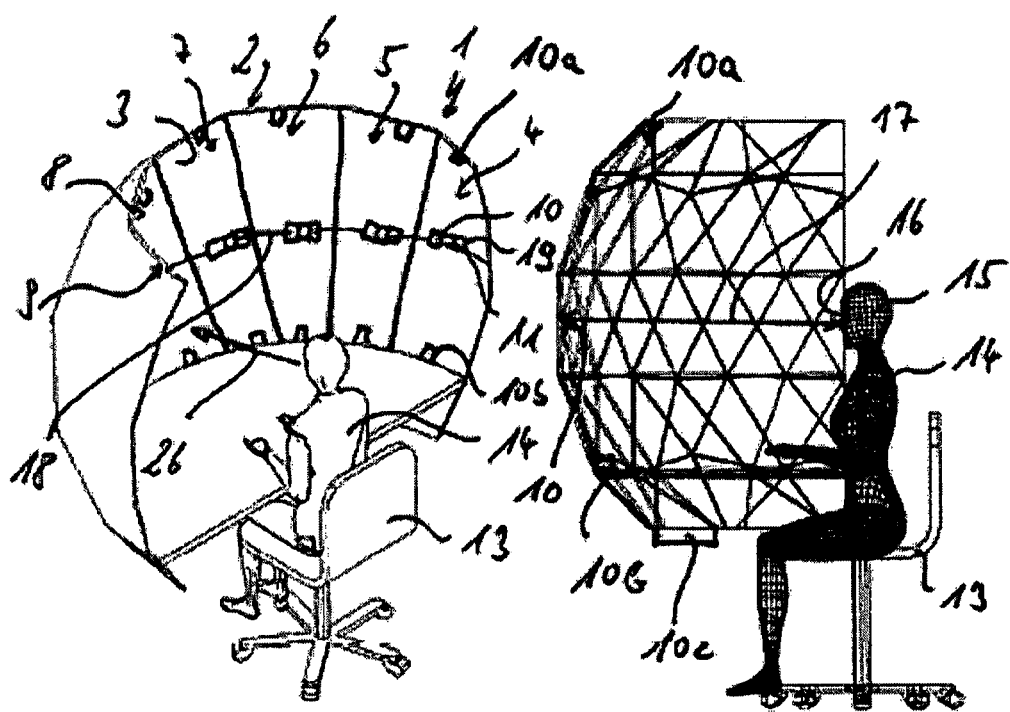
FIG. 1 shows a perspective diagram view of an exemplary user communication device and a first user in front of an image display surface.
FIG. 2 shows a cross section through the arrangement shown in FIG. 1.

The exemplary user communication device 1 shown in FIG. 1 has a large curved spherical screen 2 whose inner side forms the image display surface 3. This exemplary image display surface 3 has six horizontally disposed surface regions 4 to 9. Each region of the exemplary arrangement has respectively at least one camera 10 (numbered only as an example) and at least one microphone (11) (numbered only as an example) as assigned. As shown in the drawings, in exemplary arrangements the display surface is curved such that horizontal sides of the display surface extend outward at an acute angle relative to a central area of the display surface. The exemplary inner surface 12 of the screen 2 is spherically curved and the seat 13 of the first user 14 is configured so that the eyes of the user's head 15 look horizontally to the microphones 11 and the cameras 10. In the exemplary arrangement with the concave spherical surface of the image display surface 3, the user's eyes 16 are arranged approximately at the center of the center point of the screen 2. The radius 17 between the eyes 16 of the user 14 and surface 12 of the screen 2 in an exemplary arrangement is 0.9 m or about 1 m. In some exemplary arrangements the radius may be greater than 0.5 m or greater than 0.8 m. In some arrangements the microphones 11 like the cameras 10a and 10b can be arranged at the periphery of the image display surface such as adjacent the upper and lower edges of the image display surface.

The exemplary cameras 10 are arranged at the eye level of the user 14 and in the exemplary arrangement are horizontally disposed from one another and aligned along a horizontal line 18.

In the exemplary arrangement the image display surface 3 is a display with a plurality of image sensors which are referred to herein as cameras 10. Alternatively however, in some arrangements the display surface may comprise a reflection surface, and an image can be projected onto the image display surface 3 with at least one projector (not shown).

Alternatively or in addition, instead of the cameras 10 positioned at user eye level, cameras 10a can also be arranged on the periphery of the display surface such as adjacent an upper edge of the image display surface and cameras 10b can be arranged on the periphery at the lower edge of the image display surface 3. Suitable circuitry such as at least one computer 10c including image determining software is operative to calculate data corresponding to virtual images from the image data corresponding to the views of the cameras 10a and 10b, which calculated data corresponds to the images which would be recorded by cameras 10 positioned within the image display surface at the user eye level.

In addition to camera 10 and microphone 11, in exemplary arrangements respectively one loudspeaker 19 is arranged in each of the regions 4 to 9 of the image display surface 3. In addition or alternatively the loudspeakers 19 can also be arranged like the cameras 10a and 10b, at the periphery or adjacent at least one edge of the image display surface. Both the microphone recording and the loudspeaker reproduction can be processed through operation of the circuitry as in a stereo effect, so that they enable spatially corresponding recording and reproduction which is matched to the current facing position of the user.

In practice, two to (n) spaced part user communication devices are used simultaneously for video conference communication of two to (n) users. With increasing number (n) of users, the radius 17 of the screen 2 of each device should be increased. Alternatively to increased size, the depiction regions for presenting images of the discussion participants can be reduced for the same radius 17.

The devices 1 of the respective users 14 and 20 to 24 are each located preferably at different locations. Communication of signals is carried out between the circuitry of the respective devices.

When using the user communication devices in an exemplary system, the first user 14 initiates a video conference by means of the circuitry and software using known types of data transmission signals. In this case, the circuitry of the first user device communicates signals which correspond to invitations to the other devices of the users 20 to 24 to participate as discussion partners. In exemplary arrangements the circuitry of the communication device of the first user operates to cause the displayed images of discussion partners to be placed as further users 20 to 24 in order of the receipt of signals received from their devices which signals correspond to agreement to participate. For example, displayed user images may be arranged in the order of agreement to participate in the conference, clockwise at a virtual round discussion table 25. In reality however, each user 14 is located at the geometrical center point of the screen 2 of the respective user communication device 1 used by the participant.

In an exemplary arrangement, on each image display surface 3 of the respective user communication device of users 14 and 20 to 24, another complete image is displayed. Depending on the number of users 14 and 20 to 24, the image displays are combined from data corresponding to the views of the cameras 10 used by means of the circuitry and software which comprise a computer system for the communication of signals and image and sound processing and transmission.

During an exemplary video conference, data corresponding to a plurality of images of the first user 14 are recorded using data corresponding to views of a plurality of cameras 10 of the first device 1. The circuitry of the device 1 is operative to determine responsive to the image data, a camera which is arranged closest to the region of the image display surface 3 toward which the viewing (facing) direction 26 of the first user 14 is currently pointing. In addition, the user 20 to 24 corresponding to the region 4 to 9 onto which the viewing direction 26 of the first user 14 is directed, is determined through operation of the circuitry. The circuitry is operative to transmit signals corresponding to the data corresponding to the view of this determined camera. This user 20 to 24 is displayed through operation of the circuitry of their device, the image corresponding to the view of that camera 10 which is arranged closest to the region 20 to 24 of the image display surface 3 of the first user's device onto which the viewing direction 26 of the first user 14 is pointing.

Figure 5:
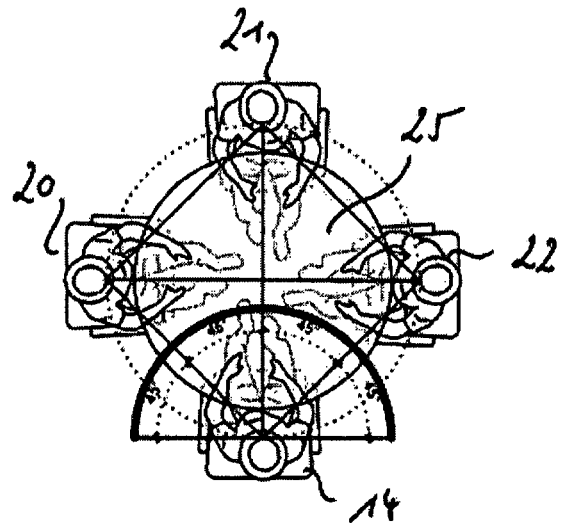
FIG. 5 shows the exemplary device used in a virtual video conference table arrangement with four discussion partners.

As an example, a video conference with four participants as represented virtually according to FIG. 5 is described hereinafter. Respectively three discussion participants have images thereof displayed on each image display surface 3 of the user communication device of individual users 14 and 20 to 22. The fourth discussion participant is in each case is the user who is using their own user communication device 1. The circuitry of the device 1 causes images of the three users 20 to 22 to be displayed to the first user 14 next to one another in respective horizontally aligned regions on his image display surface 3, and specifically in regions that correspond to the positions horizontally 45° left of the center, centrally at 0° and 45° right of the center. Of course this region arrangement is exemplary and other region arrangements may be used.

In the exemplary arrangement the eye level of the users 20 to 22, the images of which are displayed to the user 14, corresponds to the eye level of the first user 14. Each user 14 and 20 to 22 has his image captured by being in the respective views of three cameras 10 which are located in the same positions as the displayed images of the other participants: horizontally 45° left of the center, centrally at 0° and 45° right of the center. In the exemplary arrangement when two users 14 and 20 virtually look at each other, camera angles and projection angles are the same. The immersive impression of a direct conversation is obtained and is further reinforced by the radially curved image display surface 3 of the exemplary user communication devices.

When a first user 14, 20 to 22 addresses another participant in the virtual conference table environment as represented, the circuitry of the devices operates so that the latter will recognize this by means of the viewing direction 26 and the alignment of the head and the depicted upper body of the first user participant as displayed on the display surface of their device. The course of the discussion can therefore be carried out dynamically around a virtual table in the virtual conference environment which simulates a real table discussion at which all participants are physically present.

Figures 3, 4:
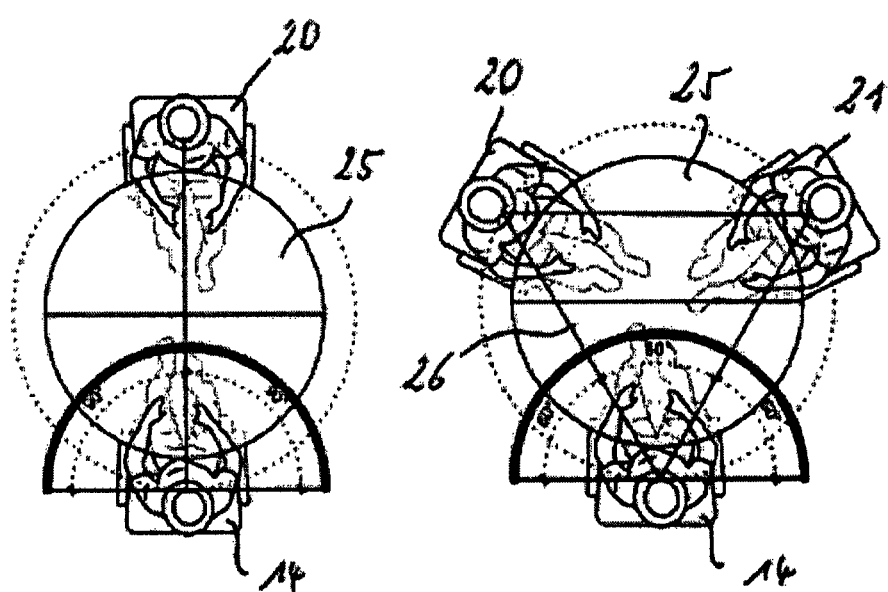
FIG. 3 shows the exemplary device used in a virtual video conference table arrangement with two discussion partners.
FIG. 4 shows the exemplary device used in a virtual video conference table arrangement with three discussion partners.

A representation of the simplest virtual conference arrangement is shown in FIG. 3. Here the circuitry in each device operates so that it appears on the display surface of the device of each user, that the users 14 and 20 are sitting directly opposite one another and the camera 10 arranged at 0° is assigned to the users.

In the exemplary representation of the virtual conference table arrangement shown in FIG. 4 the user 14 can direct his viewing direction 26 to the user 20 or to the user 21. If the user 14 faces the viewing direction 26 toward the image user 20 who is displayed on the image display surface 3 in the left region, the camera provided there is used so that the device of user 20 receives signals which correspond to the data which corresponds to the image view of the user 14 looking into the camera on his device image display surface 3, and this image is output on the display surface of the device of user 20. The device of user 21 to whom the viewing direction 26 is not specifically directed, receives signals corresponding to the image of the right-hand camera which shows the user 14 from the side.

Figure 6:
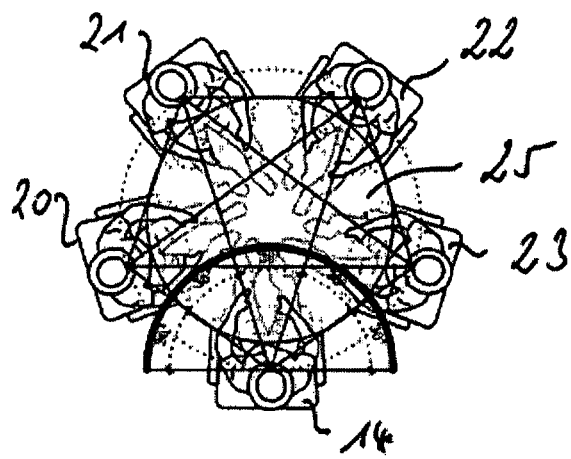
FIG. 6 shows the exemplary device used in a virtual video conference table arrangement with five discussion partners.
Figure 7:
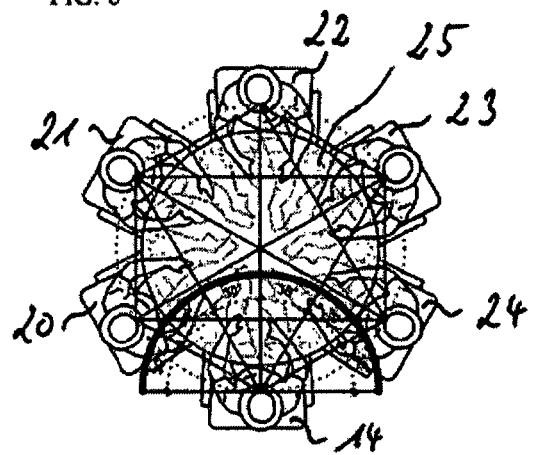
FIG. 7 shows the exemplary device used in a virtual video conference table arrangement with six discussion partners.

Accordingly, the devices of the users 20 to 24 shown in the virtual conference table arrangements represented in FIGS. 6 and 7 each receive signals corresponding to data of different images, which are produced based in the views of different cameras. Thus, the users 14 and 20 to 24 in FIG. 7 appear to the users to sit optically opposite one another at an angle of 60°. Five persons have data corresponding to respective images produced as viewed in an outward direction from their respective image display surfaces 3 of the users in each case, and for this purpose cameras are used in positions horizontally 60° and 30° left of the center, centrally at 0° as well as 30° and 60° right of the center in order to provide each user 20 to 24 the displayed image corresponding to the user to be in the correct alignment onto the image of the first user 14.

In the case of (n) participants the exemplary circuitry operates such that the displayed images of the participants sit optically at an angle α=360°/n opposite one another. N−1 persons have image data output on the display surface of each device. The cameras having the views which are used, are those positioned and used in angular positions divided horizontally uniformly into 180°/n. In arrangements that provide virtual seating arrangements at elliptical or oval virtual tables, the angles are adapted accordingly.

Since the exemplary devices should be suitable for as many discussion participants as possible, as many cameras as feasible are included as part of the user communication device which can then be used for different numbers of discussion participants.

So that the users 14 and 20 to 24 also get a feeling for which user is speaking directly, the sound of the first user 14 is captured and recorded with a microphone 11 of the first user's device, and in the case of the further users 20 to 24, is reproduced via a loudspeaker which is arranged closest to the region 4 to 9 of the image display surface 3 which displays the image of the participant, toward which the viewing (facing) direction 26 of the first user 14 corresponds when the first user is speaking. Of course it should be understood that this approach is exemplary and in other arrangements the circuitry may be operative to cause outputs from speakers adjacent to the displayed image of the participant who is speaking or from other speakers.

The exemplary devices enable communication by virtually providing conferences with participants around a table by employing the eye-to-eye principle of matching viewing directions when recording and reproducing the images of the users and preferably also simulating sound of an in-person meeting.

In some arrangements the screen 2 of the device 1 can, for example, be configured as a flat shell or be mounted on a foldable or displaceable substructure. At eye height of the first user, small cameras can then be integrated in different angular positions in the image display surface. With a diameter of, for example, about 3 mm for a camera, at the viewing distance of 0.9 m for example, this defect in the display caused by the presence of the cameras is barely perceptible.

When projection onto the display surface takes place by means of a projector, the projection can be deflected via a spherical mirror. In the case of larger radii a plurality of projectors can be used. The projector or projectors may be positioned above the screen. An undistorted image display is achieved by means of shifting, warping and/or projection mapping. The deflection can also be accomplished, for example, by means of a special lens such as a fish-eye lens.

Thus the exemplary arrangements achieve improved operation, eliminate difficulties encountered in the use of prior devices, systems and methods, and achieve the useful results described herein.

In the foregoing description, certain terms have been used for brevity, clarity and understanding. However no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

Further it should be understood that the features and/or relationships associated with one exemplary arrangement can be combined with features and/or relationships from another exemplary arrangement. That is various features and/or relationships from the various exemplary arrangements can be combined to produce further arrangements. The inventive scope of the described arrangements is not limited solely to the exact arrangements that have been shown or described herein.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

The invention claimed is:
1. Apparatus comprising:
a user communication device including:
a display surface, wherein the display surface
is configured to display images perceivable by a user positioned outward from the display surface,
includes a plurality of horizontally disposed regions,
is curved such that opposed horizontal sides of the display surface extend outward at an acute angle relative to a central area of the display surface,
a plurality of horizontally disposed cameras at respective locations along the display surface,
wherein the cameras
each have a respective view directed outward from the respective camera location along the display surface,
are operative to record data corresponding to a plurality of horizontally disposed views directed outward from each of the regions of the display surface,
circuitry, wherein the circuitry is in operative connection with the plurality of cameras,
wherein the circuitry is operative responsive to the data corresponding to the plurality of horizontally disposed views, to determine data corresponding to a respective camera view directed outward from each of the respective regions of the display surface.
2. Apparatus comprising:
a user communication device including:
a display surface, wherein the display surface is configured to display images perceivable by a user positioned outward from the display surface, wherein the display surface includes a plurality of horizontally disposed regions, a plurality of cameras,
  wherein cameras are disposed adjacent to an upper periphery and a lower periphery of the display surface in each respective region,
  wherein the cameras are operative to record data corresponding to a plurality of horizontally and vertically disposed views directed outward from each of the regions of the display surface, circuitry, wherein the circuitry is in operative connection with the plurality of cameras,
  wherein the circuitry is operative responsive to the data corresponding to the plurality of disposed views, to calculate data corresponding to a virtual camera view directed outward from the display surface in a respective location in each respective region intermediate of the upper periphery and the lower periphery.

3. Apparatus comprising:
a user communication device including:
a display surface, wherein the display surface is configured to display images perceivable by a user positioned outward from the display surface,
  wherein the display surface is concavely curved and includes a plurality of horizontally disposed regions,
a plurality of cameras,
wherein each of the plurality of cameras
  is horizontally disposed from each of the other cameras,
  is positioned in a respective region,
  is positioned in horizontally aligned relation with each of the other cameras,
  has a respective view outward from the concavely curved display surface in the respective region, and
  records data corresponding to the respective view,
circuitry, wherein the circuitry is in operative connection with the plurality of cameras,
  wherein the circuitry is operative responsive to the data corresponding to the plurality of horizontally disposed views, to determine data corresponding to a respective camera view directed outward from each of the respective regions of the display surface.

4. Apparatus comprising:
a user communication device including:
a display surface, wherein the display surface is configured to display images perceivable by a user positioned outward from the display surface,
  wherein the display surface includes a plurality of horizontally disposed regions,
at least one camera,
  wherein the at least one camera is operative to record data corresponding to a plurality of horizontally disposed views directed outward from each of the regions of the display surface,
circuitry, wherein the circuitry is in operative connection with the at least one camera,
  wherein the circuitry is operative
    responsive to the data corresponding to the plurality of horizontally disposed views, to determine data corresponding to a respective camera view directed outward from each of the respective regions of the display surface,
    to receive signals produced by each of a plurality of other user communication devices, each of which other user communication devices is remotely located from the user communication device,
    responsive to the received signals, to cause respective images to be displayed in different respective regions of the display surface, wherein the images displayed in each respective region correspond to data corresponding to at least one view of at least one camera of one other respective user communication device,
    wherein the respective images in each respective region are horizontally aligned on the display surface and the images in each respective region correspond to respective user positions around a common virtual table with the user.

5. Apparatus comprising:
a user communication device including:
a display surface, wherein the display surface is configured to display images perceivable by a user positioned outward from the display surface,
  wherein the display surface includes a plurality of horizontally disposed regions,
at least one camera,
  wherein the at least one camera is operative to record data corresponding to a plurality of horizontally disposed views directed outward from each of the regions of the display surface,
at least one microphone, and
at least one speaker,
circuitry, wherein the circuitry is in operative connection with the at least one camera and the at least one speaker,
  wherein the circuitry is operative
    responsive to the data corresponding to the plurality of horizontally disposed views, to determine data corresponding to a respective camera view directed outward from each of the respective regions of the display surface,
    to receive signals from each of a plurality of other user communication devices, each of which other user communication devices is remotely located from the user communication device,
    responsive to the received signals, to cause
    respective images to be displayed in different respective regions of the display surface, wherein the images displayed in each respective region correspond to data corresponding to at least one view of at least one camera of one other respective user communication device,
    wherein the respective images in each respective region are horizontally aligned on the display surface and the images in each respective region correspond to respective user positions around a common virtual table with the user,
    the at least one speaker to provide audible outputs corresponding to signals produced by each other respective user communication device, wherein the audible outputs provided by the at least one speaker are caused to be user perceivable as coming from the respective region in which the images corresponding to other respective user communication device are displayed.

6. Apparatus comprising:
a user communication device including:
a display surface, wherein the display surface is configured to display images perceivable by a user positioned outward from the display surface, wherein the display surface includes a plurality of horizontally disposed regions,
at least one camera,
wherein the at least one camera is operative to record data corresponding to a plurality of horizontally disposed views directed outward from each of the regions of the display surface,
circuitry, wherein the circuitry is in operative connection with the at least one camera,
wherein the circuitry is operative
responsive to the data corresponding to the plurality of horizontally disposed views, to determine data corresponding to a respective camera view directed outward from each of the respective regions of the display surface,
to receive signals produced by each of a plurality of other user communication devices, each of which other user communication devices is remotely located from the user communication device,
responsive to the received signals, to cause respective images to be displayed in different respective regions of the display surface, wherein the images displayed in each respective region correspond to data corresponding to at least one view of at least one camera of one other respective user communication device, wherein the at least one view corresponds to a determined facing direction of a remote user at the other respective user communication device,
wherein the respective images in each respective region are horizontally aligned on the display surface and the images in each respective region correspond to respective user positions around a common virtual table with the user.

7. The apparatus according to claim 1
wherein the display surface comprises a spherically curved surface having a facing direction outward toward the user.

8. The apparatus according to claim 1
wherein the display surface is concave and has a radius of greater than 0.5 m.

9. The apparatus according to claim 1
wherein the display surface is concave and has a radius of greater than 0.8 m.

10. The apparatus according to claim 1
wherein each of the plurality of cameras is linearly aligned horizontally with the other cameras.

11. The apparatus according to claim 4
wherein the at least one camera comprises a plurality of cameras,
wherein each of the plurality of cameras
is horizontally disposed from each of the other cameras,
is positioned in horizontally linearly aligned relation with each of the other cameras, and
has a respective view outward from the display surface.

12. The apparatus according to claim 4
wherein the at least one camera comprises a plurality of cameras,
wherein each of the plurality of cameras
is horizontally disposed from each of the other cameras,
is positioned in a respective region,
is positioned in horizontally linearly aligned relation with each of the other cameras, and
has a respective view outward from the display surface in the respective region.

13. The apparatus according to claim 1
wherein each of the plurality of cameras
is vertically positioned at an eye level of the user.

14. The apparatus according to claim 1
wherein the circuitry is operative to output signals corresponding to the data corresponding to each of the camera views.

15. The apparatus according to claim 1
wherein the circuitry is operative to output signals corresponding to the data corresponding to each of the camera views,
wherein the signals are usable to generate output images on a respective further display of at least one further user communication device disposed remotely from the user communication device.

16. The apparatus according to claim 1
wherein the device further includes a microphone,
wherein the microphone is configured to record audible sounds from the device user,
wherein the microphone is in operative connection with the circuitry,
wherein the circuitry is operative to output signals corresponding to the data corresponding to each of the camera views and the recorded audible sounds.

17. The apparatus according to claim 1
wherein the display surface comprises a reflection surface configured to display images projected onto the reflection surface by at least one projector.

18. The apparatus according to claim 1
wherein the device further includes
a plurality of speakers,
wherein the speakers are horizontally disposed from one another.

19. The apparatus according to claim 1
wherein the device further includes
a plurality of speakers,
wherein the plurality of speakers are configured to produce sounds that are user perceivable as originating from only a selected one of the regions.

20. The apparatus according to claim 1
wherein the device further includes
a plurality of disposed speakers,
wherein each of the plurality of speakers is
horizontally disposed from each of the other speakers, and
horizontally linearly aligned with each of the other speakers.

21. The apparatus according to claim 1
wherein the circuitry is operative
to receive signals produced by another user communication device that is remotely located from the user communication device,
responsive to the received signals, to cause images corresponding to data corresponding to at least one view of at least one camera of the another user communication device, to be displayed in one respective region of the display surface.

22. The apparatus according to claim 1
wherein the device further includes at least one speaker,
wherein the circuitry is operative
to receive signals produced by another user communication device that is remotely located from the user communication device,
responsive to the received signals, to cause
images corresponding to data corresponding to at least one view of at least one camera of the another user communication device, to be displayed in one respective region of the display surface, and to cause the speakers to produce sound that is user perceivable to originate from the one respective region of the display surface.

23. The apparatus according to claim 1 wherein the circuitry is operative to receive signals produced by each of a plurality of other user communication devices, each of which other user communication devices is remotely located from the user communication device, responsive to the received signals, to cause respective images to be displayed in different respective regions of the display surface, wherein the images displayed in each respective region correspond to data corresponding to at least one view of at least one camera of one other respective user communication device.

24. The apparatus according to claim 1 wherein the circuitry is operative to receive signals produced by each of a plurality of other user communication devices, each of which other user communication devices is remotely located from the user communication device, responsive to the received signals, to cause respective images to be displayed in different respective regions of the display surface, wherein the images displayed in each respective region correspond to data corresponding to at least one view of at least one camera of one other respective user communication device, wherein the images in each respective region are horizontally aligned on the display surface.

25. The apparatus according to claim 1 wherein the circuitry is operative to receive signals produced by each of a plurality of other user communication devices, each of which other user communication devices is remotely located from the user communication device, responsive to the received signals, to cause respective images to be displayed in different respective regions of the display surface, wherein the images displayed in each respective region correspond to data corresponding to at least one view of at least one camera of one other respective user communication device, wherein the images in each respective region are horizontally aligned on the display surface and at user eye level.

26. The apparatus according to claim 1 wherein the circuitry is operative to determine a facing direction of the user, wherein the circuitry is operative to cause the at least some of the images displayed to be determined responsive at least in part to the facing direction.

* * * * *